UNITED STATES PATENT OFFICE.

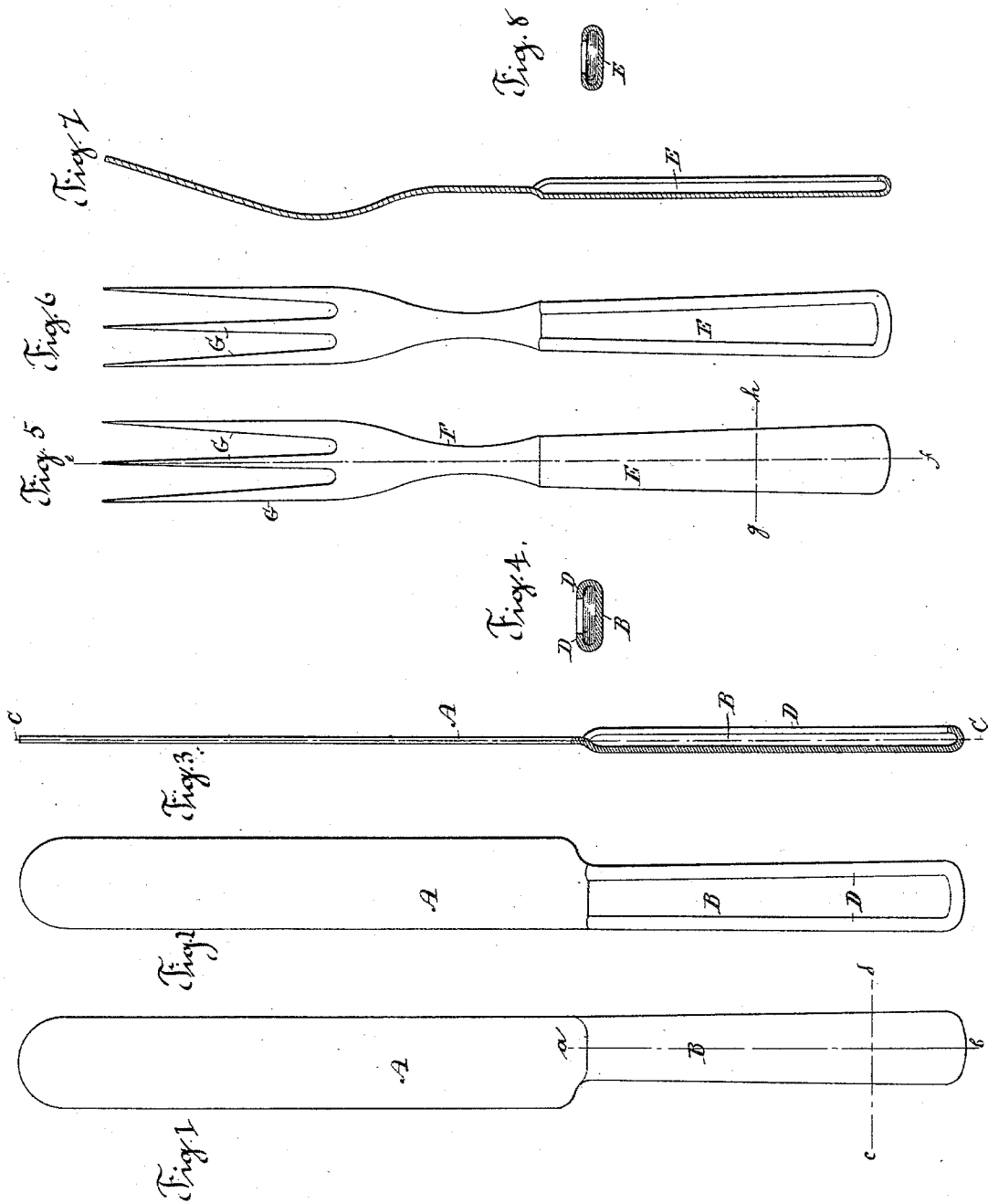

HUBERT C. HART, OF UNIONVILLE, CONNECTICUT.

TABLE KNIFE OR FORK.

SPECIFICATION forming part of Letters Patent No. 388,970, dated September 4, 1888.

Application filed January 24, 1888. Serial No. 261,739. (No model.)

*To all whom it may concern:*

Be it known that I, HUBERT C. HART, residing at Unionville, in the county of Hartford and State of Connecticut, have invented certain new and useful Improvements in Table Knives and Forks; and I do declare the following to be a full, clear, and exact description of the same, reference being had to the accompanying drawings, which form a part of this specification.

My invention relates to an improvement in table-knives and table-forks, the object being to produce a cheap, light, stiff, well-balanced, and durable article adapted to be produced with great economy of labor, material, and tools and to be easily kept clean and in order.

With these ends in view my invention consists in a knife or fork made from a single piece of metal and having a cupped handle.

In the accompanying drawings, Figure 1 is a plan view of a knife embodying my invention. Fig. 2 is a similar reverse view thereof. Fig. 3 is a view of the knife with the blade in elevation and the handle in longitudinal central section on the line $a\,b$ of Fig. 1. Fig. 4 is a view in transverse section of the knife-handle, taken on the line $c\,d$ of Fig. 1, and looking toward its outer end. Fig. 5 is a plan view of a fork made in accordance with my invention. Fig. 6 is a similar reverse view thereof. Fig. 7 is a view of the fork in longitudinal central section on the line $e\,f$ of Fig. 5; and Fig. 8 is a view of the fork-handle, taken on the line $g\,h$ of Fig. 5, and looking toward its outer end.

The blade A and handle B of my improved knife are formed by cutting and striking up a suitable blank formed from a single piece of sheet metal, the handle being cupped and struck up to extend beyond the opposite faces of the blade, the plane whereof extends about centrally through it, as shown by the broken line C of Fig. 3 of the drawings. The flanges D of the handle are drawn inward toward each other, as shown by Fig. 4 of the drawings, to stiffen the knife and make it pleasanter to the hand. After the knife has been formed, the handle may be finished by plating it or providing it with a coating of enamel; or it may be polished or finished in any other suitable manner.

The fork, including the handle E, shank F, and tines G, is made in the manner described for the knife, except that the blank is properly struck up to give the requisite curves to the shank and tines, as shown best by Fig. 7 of the drawings, the handle being struck up to extend beyond the opposite faces of the fork-shank.

Table knives and forks made in accordance with my invention are light, stiff, well-balanced, durable, pleasant, and convenient to use and capable of being produced without waste of stock and with the minimum of outlay for labor and tools. They are also easy to keep clean and in order, as their handles, being open, are wiped dry readily.

Having fully described my invention, what I claim as new, and desire to secure by Letters Patent, is—

A table-knife or table-fork made from a single piece of sheet metal and having a cupped handle, substantially as set forth.

In testimony whereof I have signed this specification in the presence of two subscribing witnesses.

HUBERT C. HART.

Witnesses:
BESSIE JOHNSON,
M. S. SEELEY.